United States Patent

[11] 3,526,218

[72] Inventors Robert E. Reiss
 St. Louis, Missouri;
 Jack D. Merry, Bridgeton, Missouri
[21] Appl. No. 645,810
[22] Filed June 13, 1967
[45] Patented Sept. 1, 1970
[73] Assignee Sherwood Medical Industries Inc.

[54] FLUID PRESSURE MEASURING DEVICE
 11 Claims, 18 Drawing Figs.
[52] U.S. Cl. ..................................... 128/2,
 73/393, 73/402; 128/2.05
[51] Int. Cl. ....................................... A61b 5/02
[50] Field of Search ........................................ 128/2,
 2.05D; 73/401, 402, 420, 393; 165/179, 183, 135;
 128/2, 2.05; 73/401, 402, 420

[56] References Cited
UNITED STATES PATENTS

| | | | |
|---|---|---|---|
| 2,396,351 | 3/1946 | Thompson | 128/2 |
| 2,535,998 | 12/1950 | Bierman | 128/2.05 |
| 2,600,324 | 6/1952 | Rappaport | 128/2.05 |
| 2,866,453 | 12/1958 | Jewett | 128/2.05 |
| 3,002,729 | 10/1961 | Welsh | 165/179 |
| 3,033,038 | 5/1962 | Murphy | 128/2.05X |
| 3,062,202 | 11/1962 | Hyman et al | 128/2.05 |
| 3,242,920 | 3/1966 | Andersen | 128/2.05 |

OTHER REFERENCES

Surgical Equipment, May-June 1935, vol. 2 No. 3, p. 12
(copy in GR335, 128-2.05)

*Primary Examiner*—Richard A. Gaudet
*Assistant Examiner*—Kyle L. Howell
*Attorney*—Hofgren, Wegner, Allen, Stellman and McCord ABSTRACT: A fluid pressure measuring device of the closed end type wherein the fluid being tested flows directly into a passageway of capillary dimension and compresses air in the passageway and in an enlarged compression chamber that is aligned axially therewith. Valve means is connected with the device so that a unique method of measuring the pressure of body fluids, such as cerebrospinal fluid, can be practiced by controlling the flow of fluid into and out of the device. The device includes heat dissipating means so that the accuracy of the device will not be effected by body heat, when the device is manually handled.

Patented Sept. 1, 1970
3,526,218
Sheet 1 of 3
FIG.1
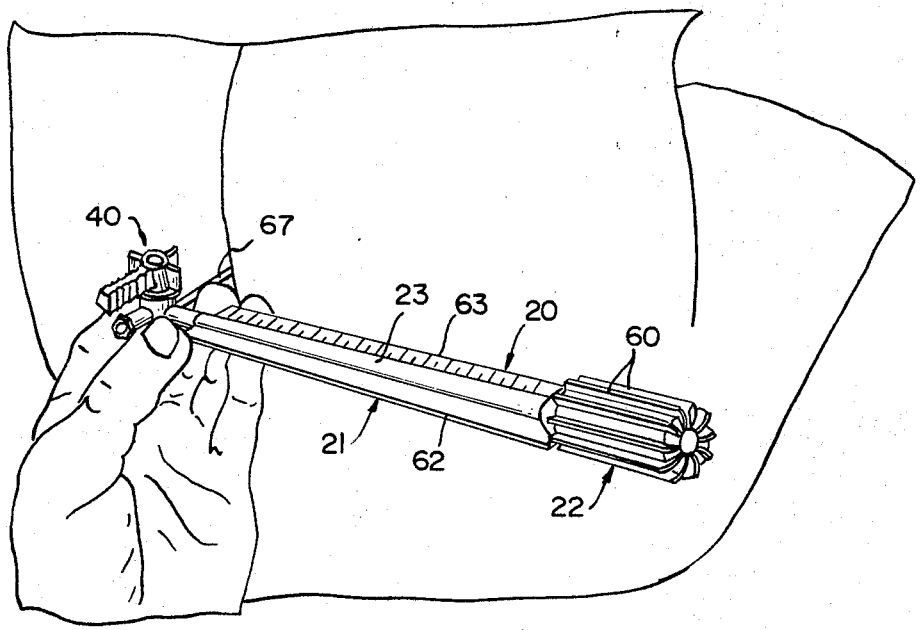
FIG.2
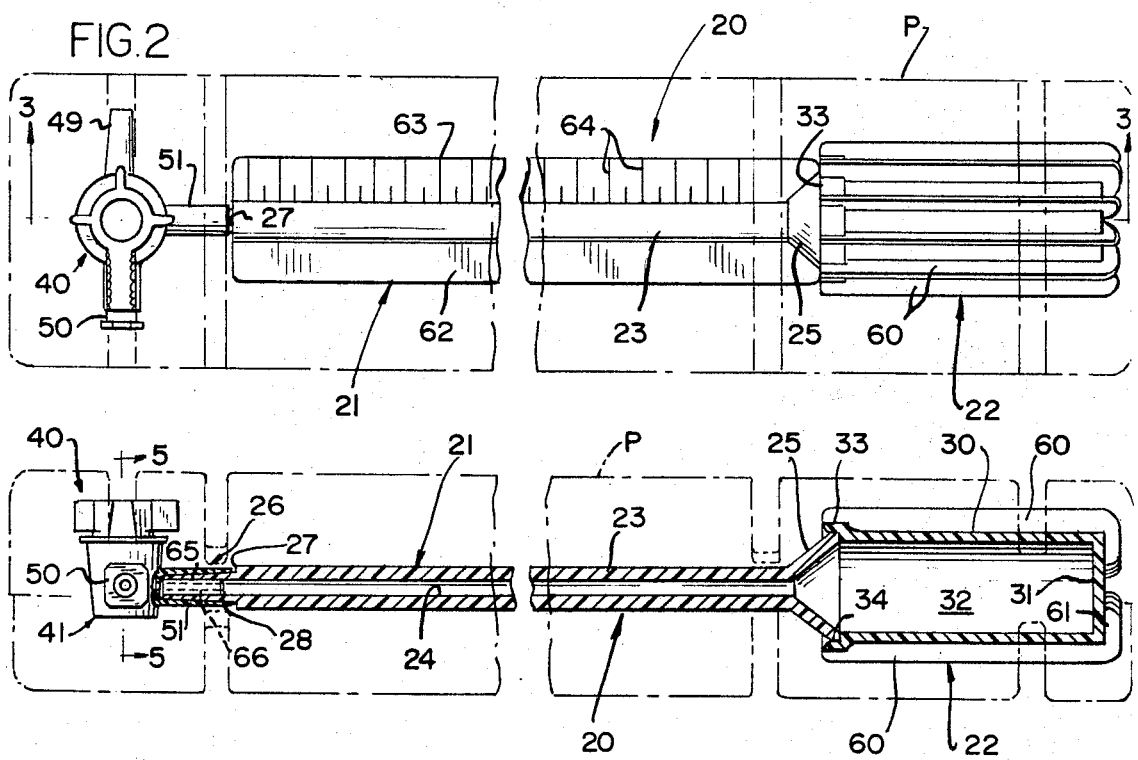
FIG.3
INVENTORS
ROBERT E. REISS
JACK D. MERRY
BY Hofgren, Wegner, Allen,
Stellman & McCord.
ATTORNEYS.

FLUID PRESSURE MEASURING DEVICE

BACKGROUND OF THE INVENTION

The pressure measuring device of the present invention is particularly adapted for use in the surgical arts in measuring body fluid pressures, and is most suitable for use in measuring cerebrospinal fluid pressure.

Heretofore, it has been conventional to use an open ended manometer of the U-tube or straight tube type for measuring spinal fluid pressure. Such devices must be held in a vertical position, and are extremely cumbersome in use, particularly when the patient is in the lateral recumbent position, and when the spinal fluid pressure is abnormally high. When the patient is in the lateral recumbent position, additional lengths of tubing are required to make a reading, and this places a strain upon the lumbar puncture needle and usually necessitates the use of an assistant to support the pressure measuring device. When cerebrospinal fluid pressure readings are made with the patient in a sitting position, the pressure in the vertically arranged manometer is influenced by the hydrostatic pressure, requiring additional lengths of tubing to advance the calibrated scale above the foramen magnum and a considerable loss of cerebrospinal fluid to the manometer takes place which can affect the pressure determination. Prior art devices for measuring cerebrospinal fluid pressure have not been disposable, and in fact have been used repeatedly after sterilization to take the cerebrospinal fluid pressure of different patients. Obviously, the cross contamination problems that are inherent in prior art devices have caused a great deal of difficulty; and typically, prior art devices have been so expensive that disposal of the device after a single use has been totally impractical.

Accordingly, one of the principal objects of the present invention is to provide a body fluid pressure measuring device that is so simple in design, and inexpensive to manufacture that the device is sufficiently economical that it can be disposed of after a single use. To this end, the present invention contemplates the use of a closed end, direct fluid actuating manometric device thereby obviating the need for an intermediate fluid within the device. The body fluid being measured enters into a calibrated passageway of capillary dimension and compresses a quantity of air in an enlarged compression chamber that communicates with the calibrated passageway. The device of the present invention operates on the principle of Boyle's law, that is, the pressure of a confined body of gas varies directly with the volume of the gas, provided the temperature remains unchanged. Accordingly, in the device of the present invention, the body fluid directly compresses a quantity of air in the device until an equilibrium condition is reached which is indicative of the body fluid pressure, and means are provided on the device for minimizing the amount of heat transferred to the air trapped within the device when it is manually handled so that the temperature of the compressed air will remain substantially constant.

More particularly, the present invention contemplates the provision of a closed end manometric device for measuring body fluid pressure wherein the device is adapted to be held in a horizontal position, and the body fluid passes into a capillary passage that communicates directly with an enlarged, coaxially arranged compression chamber. The body fluid whose pressure is being measured will compress a quantity of air within the device to an extent that the pressure of the compressed air will balance the pressure of the body fluid, so that the capillary passage may be calibrated to thereby give an indication of the body fluid pressure. The use of a closed end manometric device makes it possible that the body fluid pressure measuring device be so small as to be readily held within the hand of a surgeon, or other technician, making the body fluid pressure measurement. Since the compressibility of air is approximately the same over the expected pressure range (approximately 4 to 60 centimeters of water), it will be appreciated that a linear relationship exists between the relationship of the applied pressure and the scale reading. Accordingly, the device of the present invention is not only extremely light and small, so as to be readily usable by a single individual, but also, the device is sufficiently accurate within the expected pressure range to give a positive indication of the fluid pressure of the individual being tested. Only small quantities of fluid are necessary for the pressure, and therefore the degree of danger to the patient is materially lessened. Furthermore, the device of the present invention is so simple, and is formed of such inexpensive materials, that it can be readily disposed of after a single use, thereby eliminating cross contamination problems that are inherent in prior art reuseable devices.

Another important feature of the present invention is the provision of an improved device for making body fluid pressure measurement wherein repeated measurements can be made and a plurality of fluid samples taken without removing the fluid withdrawal member from the body.

BRIEF DESCRIPTION OF THE DRAWINGS

FIG. 1 is a perspective view illustrating a preferred embodiment of the spinal fluid pressure measuring device of the present invention in use in making a spinal fluid pressure measurement on a patient in a seated position;

FIG. 2 is a plan view of the device of FIG. 1 on an enlarged scale, and showing a sterile package for the device in broken lines;

FIG. 3 is a cross sectional view taken generally along line 3—3 of FIG. 2;

DESCRIPTION OF THE PREFERRED EMBODIMENTS

Figure 4:
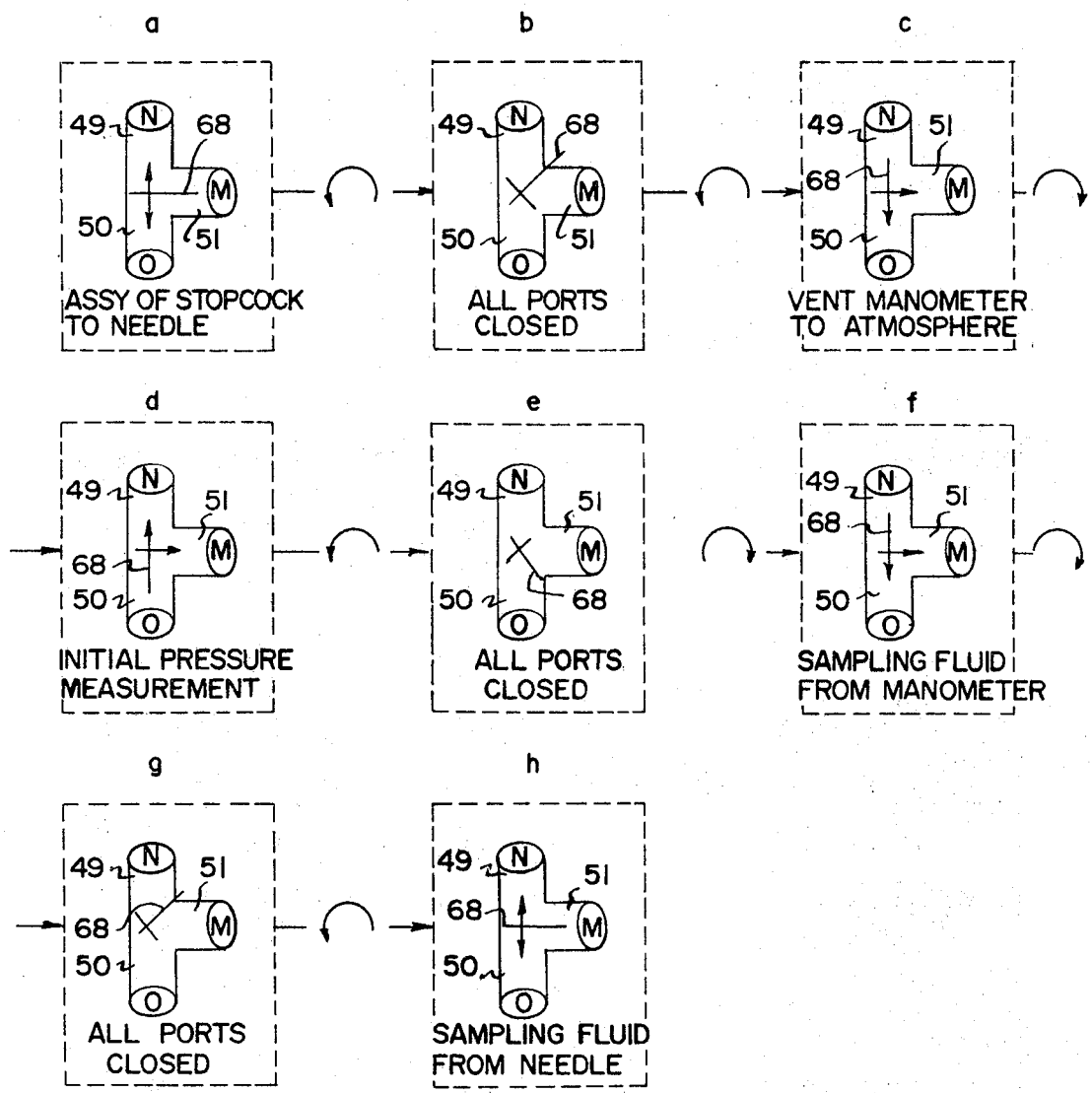
FIGS. 4a—4h are diagrammatic views illustrating the step-by-step process for taking body fluid pressure measurements with the device of the present invention.

While this invention is susceptible of embodiment in many different forms, there is shown in the drawings and will herein be described in detail a preferred embodiment of the invention and a modification thereof with the understanding that the present disclosure is to be considered as an exemplification of the principles of the invention and is not intended to limit the invention to the embodiments illustrated. The scope of the invention will be pointed out in the appended claims.

Referring now to the embodiment of FIGS. 1—6, the fluid pressure measuring device is indicated in its entirety by reference numeral 20 and includes a gage portion 21, and a head portion 22.

Gage portion 21 is partially defined by an elongate cylindrical wall 23 having an internal bore 24 of capillary dimension, as will hereinafter appear. Gage portion 24 further includes a generally frusto-conically shaped transitional wall portion 25 extending axially outwardly from the right-hand end of wall 23, as viewed in FIG. 3, for connecting the gage portion 21 with the head portion 22. Gage portion 21 includes means 26 at the end thereof opposite from end head 22 for placing bore 24 in communication with the fluid whose pressure is being measured. For this purpose, the left-hand end of wall 23 is provided with an inclined shoulder 27, and a hollow projection 28 extends outwardly from shoulder 27, to the left as viewed in FIGS. 2 and 3. Bore 24 extends through projection 28, and the external periphery of projection 28 is uniformly inclined to provide a male luer member connectable with valve means to be hereinafter described.

Head 22 is defined by a cylindrical wall 30 that is coaxially aligned with wall 23, and a circular wall 31 extends transversely to the axis of wall 30 and closes the right-hand end thereof to define a chamber 32 therewithin. Wall 30 includes an enlarged skirt 33 at the end thereof opposite from wall 31, and skirt 33 embraces the outer surface of the end of the transitional portion 25 of gage member 21. A shoulder 34, disposed generally perpendicularly with respect to axis of wall 30, is provided immediately inwardly of the left-hand end of wall 30, as viewed in FIG. 3, and provides a seating surface for the outer end of the transitional portion 25. Gage portion 21 and head 22 are preferably formed of an inexpensive moldable plastic material, such as the cellulose propionate molding formulation available from the Eastman Chemical Products, Inc. subsidiary of Eastman Kodak Company under formula 306 MH. Head 22 may be secured to gage portion 21 in any suitable manner, such as by solvent welding, so as to provide an air tight seal between the head and the gage portions.

Valve means 40 is associated with the pressure measuring device 20, and the valve means is preferably a three-way stopcock type, such as that disclosed in the patent application of Fritz Deuschle, Ser. No. 745,809, filed June 13, 1967, and assigned to the assignee of the present invention. Reference may be made to the Deuschle application for a detailed description of the valve means 40. The disclosure of the Deuschle application is hereby incorporated by reference in its entirety in the present application.

Figure 5:
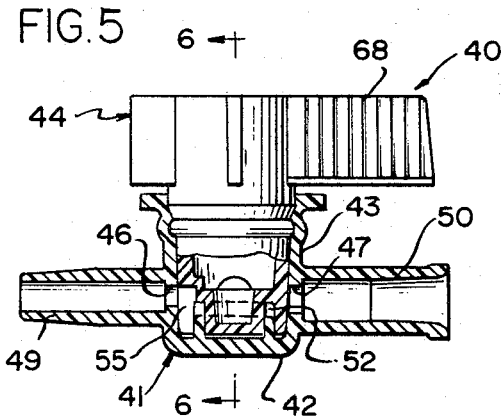
FIG. 5 is an enlarged cross sectional view taken generally along line 5—5 of FIG. 3.
Figure 6:
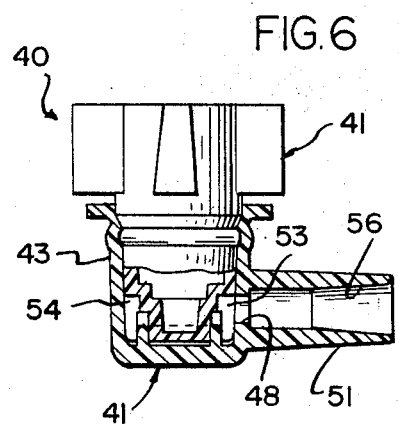
FIG. 6 is an enlarged cross sectional view taken generally along line 6—6 of FIG. 5.
Figure 7:
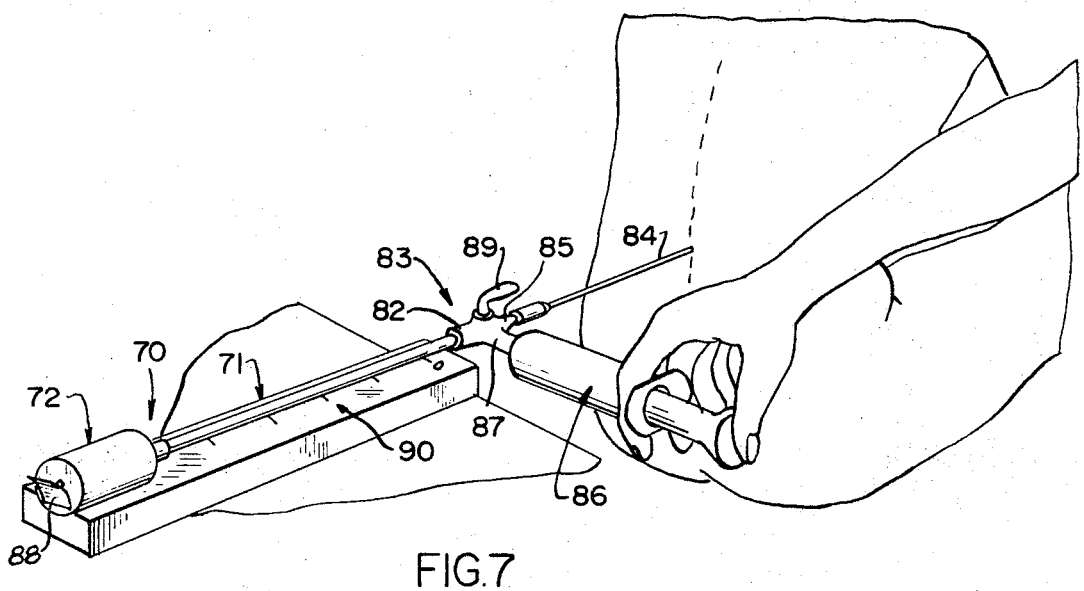
FIG. 7 is a perspective view, similar to FIG. 1, and showing a modification of the invention.
Figure 8:
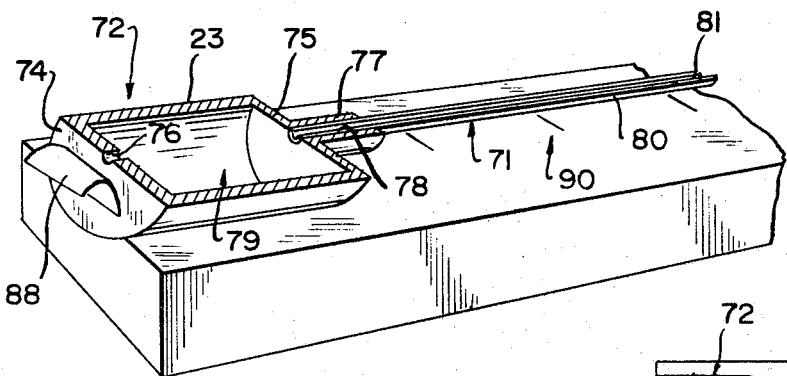
FIG. 8 is a fragmentary perspective view showing the pressure-measuring device of FIG. 7 in central cross section.

Valve 40 will be best understood from a consideration of FIGS. 5 and 6, and as shown therein, valve 40 includes a valve body 41 having a circular base 42, and an upstanding, slightly outwardly inclined, wall 43 extends upwardly from the periphery of base 42. Wall 43 and base 42 cooperate to define a valve chamber in body 41, and the lower portion of a plug member 44 is rotatably mounted in the valve chamber. Three ports 46—48 are provided in an intermediate portion of wall 43 with ports 46 and 47 being diametrically aligned, and port 48 being disposed perpendicularly with respect to ports 46 and 47. Elongate duct members 49—51 extend generally radially outwardly from wall 43 in alignment with ports 46—48, respectively. An annular recess 52 is provided in the bottom of plug 44, and radial passages 53—55 in the lower portion of the outer wall of plug 44 communicate with recess 52, and are selectively movable into communication with ports 46—48. The bore 56 of duct 51 is provided with a female luer taper, and duct 51 is slidable over the projection 28 of the manometer 20, to assemble the valve 40 thereto.

As is evident from FIG. 1, the pressure measuring device 20 of the present invention is extremely small, and can be readily held in the hand of the user. In order to minimize the amount of heat transferred to the air trapped within capillary passage 24 and chamber 32, fin structure is provided for dissipating the body heat of the user's hand. The fin structure includes a plurality of elongate fins 60 that extend radially outwardly of wall 30. Fins 60 extend the entire length of wall 30 and skirt 33, and include portions 61 that extend radially inwardly of end wall 31. The fins 60 are spaced sufficiently closely to one another that the user's hand will never touch the head wall 30, and in an exemplary embodiment, twelve fins 60 are provided at 30° increments around the head 22. The fin structure further includes a pair of coplanar wings 62 and 63 that extend outwardly from diametrically opposed sides of wall 23. Wings 62 and 63 extend throughout the entire length of the gage portion 21, including the transitional portion 25. Calibrations 64 are provided on the wing members in juxtaposition with the transparent wall 23, so that the pressure of the fluid passing into the passage 24 can be easily read.

Calibrations 64 are preferably in centimeters of water, and the lower or left-hand end of the scale may be six centimeters and the upper or right-hand end of the scale may be sixty centimeters. The normal cerebrospinal fluid pressure range is 11.0 to 17.5 centimeters of water with the patient lying on his side (41.0 to 47.5 centimeters of water with a patient in sitting position). However, the cerebrospinal fluid pressure may vary through a range as low as 7.0 centimeters of water and as high as 20 centimeters of water with the patient lying on his side.

In order to increase the accuracy of the manometer at the lower end of pressure range, an insert 65 is provided in the outer end of the bore of projection 28. Insert 65 preferably has a cylindrical central section that is at least as large in diameter as bore 24, so that the insert 65 must be press fit into the bore 24. The outer sections of insert 65 are preferably provided with a male luer taper, so as to facilitate insertion of the insert 65 into the bore 24. Insert 65 includes a central bore 66 that is substantially smaller in diameter than bore 24, it being understood that the size of bore 66 is sufficiently large to enable the body fluid being tested to flow from the valve 40 into the bore 24. However, the bore 66 in insert 65 is sufficiently small that the quantity of fluid within the extension 28 is held to a minimum, so that only an extremely small quantity of body fluid is necessary to give a pressure indication, even at the low end of the pressure scale.

In an exemplary embodiment of the invention, the overall length of the device 20 from the end of projection 28 to the outer fin ends 61 is slightly less than 9 inches. Chamber 32 in head 22 is approximately ⅝ inch in diameter, and is about 1–¾ inches long, so as to have a volume of approximately .57 cubic inch. The outer diameter of wall 23 is approximately ¼ inch, with bore 24 being about .084 inch in diameter. The length of wings 62 and 63 is about 6–½ inches, and the length of projection 28 is about ½ inch. Insert 65 is approximately .430 inch long, and bore 66 is about .025 inch in diameter. The internal volume of gage member 21, including transitional section 25, is approximately .074 cubic inches. It should be understood that the above dimensions are given for purposes of example only, and are not meant in any respect to limit the invention to the specific figures mentioned.

The method of using the pressure measuring device will be best understood from a consideration of FIGS. 1 and 4. A fluid withdrawal member is first placed in communication with the body fluid whose pressure is being measured, and as illustrated in FIG. 1, when the device 20 is used to measure cerebrospinal fluid pressure, a lumbar puncture needle 67 is inserted into the patient's spine. Once the needle 67 is in place and the flow of fluid from the needle is observed, the duct 49 of valve 40 is connected to the needle 67.

As is explained in detail in the above-mentioned Deuschle application, valve plug 44 includes an elongate handle 68 that extends outwardly from a side of the plug that has no passage, so that the location of the handle 68 will indicate which of the valves ports is closed. It will be understood, of course, that when the valve plug is rotated to position the handle 68 intermediate any of the ducts 49—51, all of the ports are closed. FIG. 4 contains a series of diagrammatic illustrations *a—h* showing the position of the valve handle 68 during the various steps of the method, and it will be noted that in FIG. 4*a* when the valve is assembled to the needle, the port 48 to the manometer 20 is closed, while the ports 46 and 47 are in communication with one another, so that the fluid entering the interior of the valve through the needle 68 will appear at duct 50.

When the fluid is observed, the handle 68 is rotated 45° in a counterclockwise direction to the position illustrated in FIG. 4*b* to close each of the ports 46—48, it being understood that at this time the recess 52 in the interior of the valve plug is filled with cerebrospinal fluid. The manometer 20 is then assembled to the valve 40 by inserting the projection 28 in the bore 56 of duct 51, and manometer 20 may be twisted slightly back and forth to make sure that a fluid tight seal exists between the valve and the manometer.

Handle 68 is then rotated 45° in a counterclockwise direction to the position of FIG. 4*c* to block the port 46 to the needle 67, and place the ports 47 and 48 in communication. This enables any air that may have been compressed in the manometer 20 during the assembly of the manometer to the valve to escape to atmosphere through duct 50.

Handle 68 is then rotated 180° in a clockwise direction to the position of FIG. 4d to place the needle 67 in communication with the manometer 20, and an initial pressure measurement is made. The manometer 20 is held in a horizontal position to obviate any pressure head effects, and the fluid under pressure entering the capillary passage 24 will compress the air within the passage 24 and enlarged head 32 until the pressure of the compressed air balances the fluid pressure. At this time, the position of the meniscus of the fluid may be noted and the body fluid pressure read from scale 64.

The handle 68 is then rotated 45° in a counterclockwise direction to the position of FIG. 4e to stop the fluid flow. A specimen vial is then positioned under duct 50, and the handle 68 is rotated 135° to the position shown in FIG. 4f to block the port 46, and place the ports 47 and 48 in communication. The air that has been compressed in bore 24 and chamber 32 will quickly force the fluid out of the manometer 20 and out of the valve 40 through duct 50. During the last step, the handle should be turned slowly to prevent the fluid from immediately rapidly moving out of the manometer, which may cause air bubble fractionation of the fluid column.

After the sample has been collected, the handle 68 is rotated 45° in a clockwise direction to the position of FIG. 4g to stop the flow, and a second vial is placed under the duct 50. The handle 68 is then rotated 45 degrees in a clockwise direction to the position of FIG. 4h to block port 48 and place ports 46 and 47 in communication, whereupon a second sample, directly from the needle 68 may be collected. The steps illustrated in FIGS. 4d—4h may then be repeated for a second pressure measurement and a final sample collection. Finally, the apparatus is disassembled and discarded.

From the foregoing it is believed apparent that the manometer 20 is not only extremely simple in design and thus inexpensive; but also, the method of using the manometer in combination with the valve means 40 is extremely simple and provides a technique wherein repeated pressure measurements can be made and plural samples accumulated in a minimum amount of time and with a minimum effort by the surgeon, thus maximizing the degree of safety of the patient. The device is extremely accurate over the expected pressure range, and only a minimum amount of fluid is required for the pressure measurement. For example, a pressure of 30 centimeters water with a standard device requires almost 1 milliliter of fluid while less than .3 of one milliliter of fluid is required to affect this pressure reading with the device of the present invention. The device of the present invention has a much faster dynamic response than prior art devices, in that it takes less time for a steady state condition to be reached, and as a consequence, the pressure measurement is much faster. The device is extremely small, and can be readily accommodated in the palm of the hand with the lumbar puncture needle and the manometer in the same field of vision, thus permitting complete control of the instrument. The device can be used equally well with no additional parts on patients who are either lying on their side or sitting, and since the device is calibrated beyond the range of significance, it is unnecessary to change its size, position or weight. The device is completely disposable and thus cross contamination problems that are inherent in reuseable devices are eliminated. The device is sufficiently small that it can be conveniently stored in a sterile package, which is indicated in broken lines by reference character P in FIGS. 2 and 3.

Referring now to the embodiment of FIGS. 7—11, the pressure measuring device 70 disclosed therein includes a gage portion 71 and an enlarged generally cylindrically shaped head 72. Head 72 is defined by a cylindrical side wall 73 and transverse circular walls 74 and 75 at opposite ends thereof. A central vent opening 76 is provided in wall 74, the purpose of which will hereinafter appear. A cylindrical projection 77 extends outwardly from wall 75, and is provided with a central bore 78 that is substantially smaller in diameter than the enlarged chamber 79 within head 72.

Gage portion 71 is defined by a tube 80 having a small bore 81 of capillary dimension, with a first end of the tube 80 being received in bore 78, and the opposite end of tube 80 being received in a duct member 82 of a three-way stopcock type valve 83. A lumbar puncture needle 84, or other suitable device, is connected to a second duct member 85 of valve 83, and a hypodermic syringe 86 is connected to a third duct member 87 of valve 83.

Figure 9:
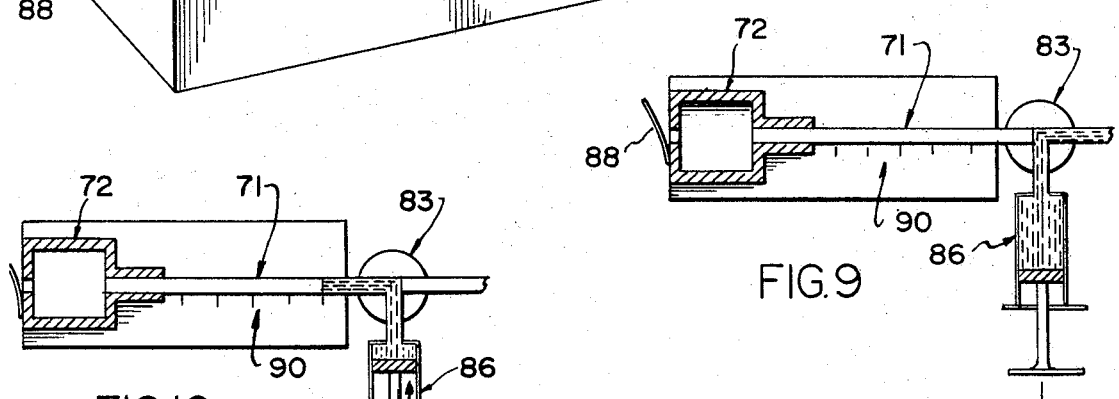
FIGS. 9—11 are similar cross sectional representations of the use of the device of FIG. 7 in various steps in the measurement of body fluid pressure.
Figure 10:
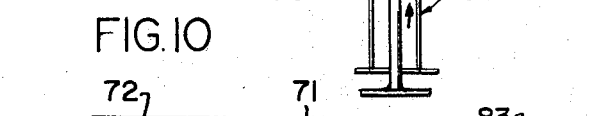
Figure 11:
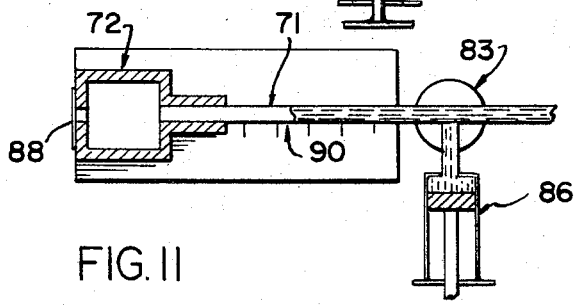

The method of making a spinal fluid pressure measurement with the device 70 will be best understood from a consideration of FIGS. 9—11. A tape valve 88 is provided on the outer surface of head wall 74, and normally closes venting opening 76. The spinal needle 84 is first inserted in the patient and the stopcock 83 assembled to the needle 84 with the needle port closed. The manometer 70 and syringe 86 are then connected to the stopcock 83. The tape valve 88 is then peeled back to expose opening 76, and the stopcock handle 89 is rotated to close the manometer port and place the hypodermic syringe 86 in communication with the needle 84 as is shown in FIG. 9. A quantity of cerebrospinal fluid is then withdrawn into the syringe 86, as is illustrated in FIG. 9, and then the stopcock handle 89 is rotated to close the needle port and place the manometer 70 in communication with the hypodermic syringe 86. The fluid is then pumped into the gage portion 71 of manometer 70 until the meniscus of the fluid reaches the zero point on the scale 90 that is positioned adjacent the gage portion 71. The tape valve 88 is then closed to seal opening 76, and the stopcock handle 89 is rotated to close the port to the syringe 86, and place the needle 84 in communication with the manometer 70. The fluid pressure will cause the meniscus of the fluid to travel along the gage portion 80 and compress the air within bore 81 and chamber 79, and when an equilibrium condition is reached, a pressure reading from scale 90 may be taken. The needle port is then closed, the tape peeled back from the venting opening 76, and the fluid withdrawn from the gage portion 71 until the meniscus of the fluid reaches the zero point of the scale 90. Additionally, pressure readings can then be made by closing the tape valve and repeating the above steps.

We claim:

1. A fluid pressure measuring device comprising: a body member having a bore of capillary dimension therein, said bore having an inlet end and an outlet end, said bore communicating at its outlet end with a closed-end compression chamber having a larger diameter and volume than said bore, calibrations on said body member in juxtaposition with said bore, said calibrations being based upon a pre-selected zero calibration point adjacent the inlet end of said bore, said bore communicating at its inlet end with a fluid withdrawal member for placing said bore in communication with the fluid whose pressure is being measured, flow regulating means adapted to be selectively operated to permit said fluid to flow to precisely said zero calibration point and to flow beyond said zero calibration point, and venting means adapted to be selectively operated to permit said bore and said chamber to be vented to the atmosphere when said fluid has reached said zero calibration point and thereafter to be closed, whereby the air confined within said bore and within said chamber will be in an uncompressed state when said fluid is at said zero calibration point and will be compressed when said fluid moves beyond said zero calibration point, the distance said fluid moves along said bore beyond said zero calibration point being a function of the pressure thereof.

2. A fluid pressure measuring device as set forth in claim 1 wherein said venting means comprises an opening in the wall of said chamber and a removable cover means for said opening.

3. A fluid pressure measuring device as set forth in claim 1 wherein said flow regulating means includes a valve member having a first port communicating with the inlet end of said bore and a second port communicating with said fluid withdrawal member, and operating means associated with said valve member for selectively opening and closing said ports.

4. A fluid pressure measuring device as set forth in claim 3 wherein said valve member has a third port, and said flow regulating means further includes a syringe member communicating with said third port, said operating means being further adapted for selectively placing said second and third ports in communication for withdrawing said fluid into said sryinge member, and for placing said first and third ports in communication for pumping said fluid from said syringe member to said zero calibration point, and for placing said first and second ports in communication for making a pressure measurement.

5. A fluid pressure measuring device as set forth in claim 3 wherein said venting means comprises a third port in said valve member which is open to the atmosphere, and said operating means is further adapted for selectively placing said first port in communication with said third port.

6. A fluid pressure measuring device as set forth in claim 5 wherein said operating means is further adapted for selectively placing said first and second ports in communication for making a pressure measurement, and for placing said second and third ports in communication for collecting a sample of said fluid.

7. A fluid pressure measuring device as set forth in claim 3 wherein said zero calibration point is coincident with said inlet end of said bore, and opening said second port with said first port closed results in said fluid flowing to precisely said zero calibration point.

8. A fluid pressure measuring device as set forth in claim 7 wherein said bore has a reduced inside diameter adjacent its inlet end.

9. A fluid pressure measuring device as set forth in claim 1, further including means associated with said body member for reducing the effect of the body heat of a user's hand on the air trapped in said bore and said chamber.

10. A fluid pressure measuring device as set forth in claim 9 wherein said compression chamber is defined by a generally cylindrical wall and said heat effect reducing means includes a plurality of circumferentially spaced axially elongate fins extending radially outwardly of said wall.

11. A fluid pressure measuring device as set forth in claim 10 wherein said bore is defined by a generally cylindrical wall of smaller diameter than said compression chamber wall and aligned axially therewith, said heat effect reducing means further including a pair of axially elongate generally coplanar fins extending radially outwardly from said bore wall at opposite sides thereof.